Nov. 26, 1935. W. L. CHAPMAN 2,022,403
FILTER
Original Filed Sept. 30, 1931 4 Sheets-Sheet 1
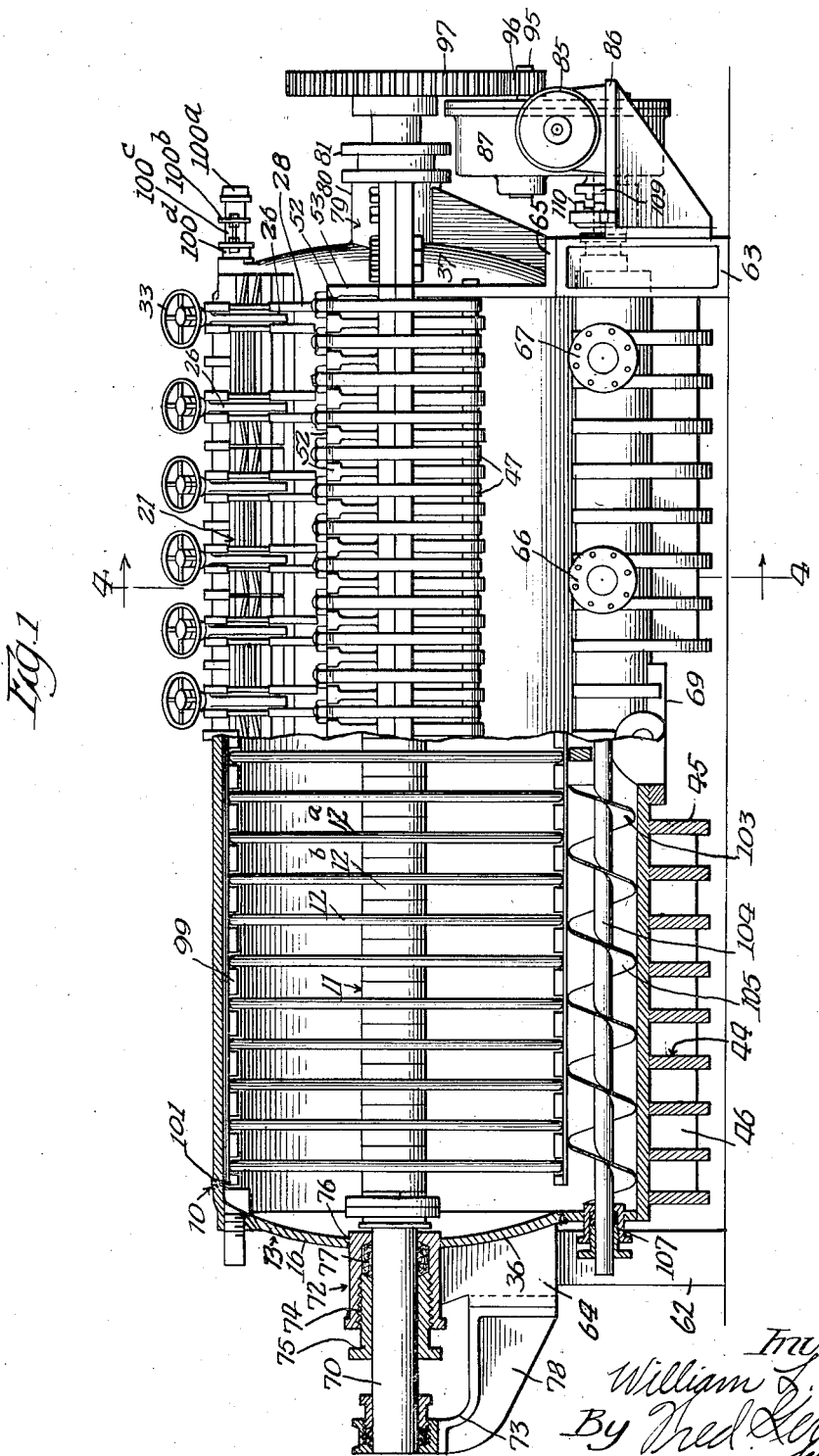

Nov. 26, 1935.   W. L. CHAPMAN   2,022,403
FILTER
Original Filed Sept. 30, 1931   4 Sheets-Sheet 2
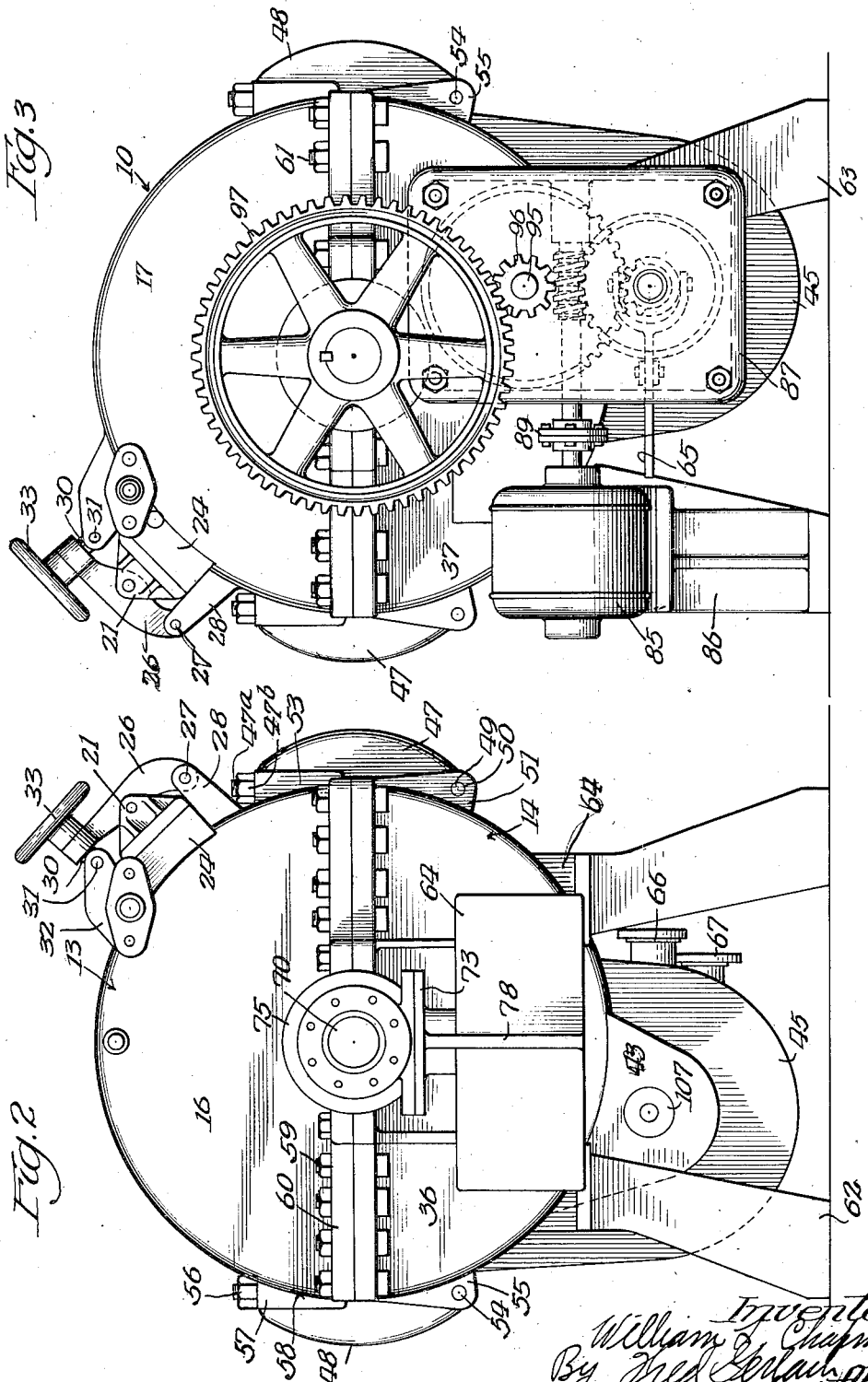

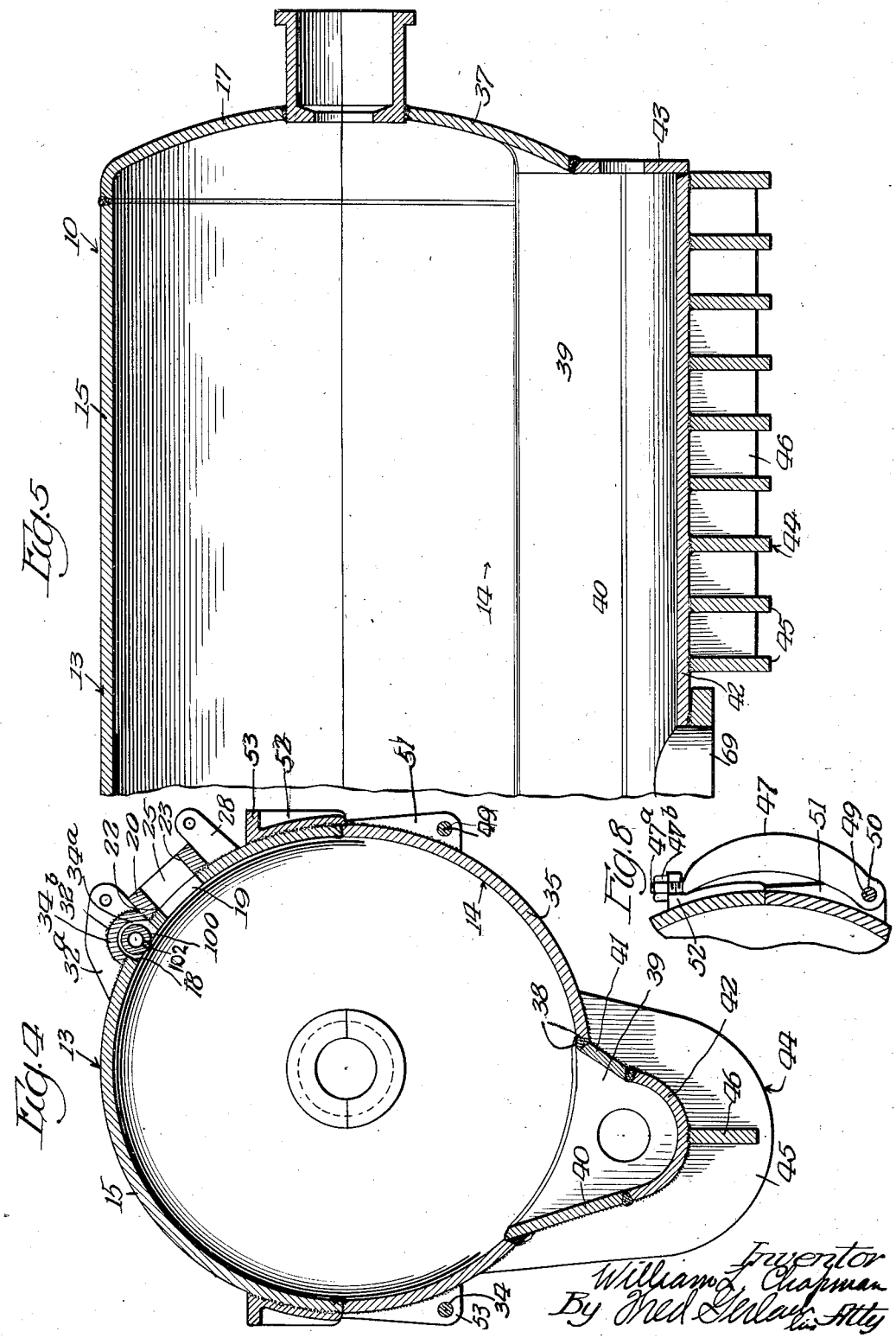

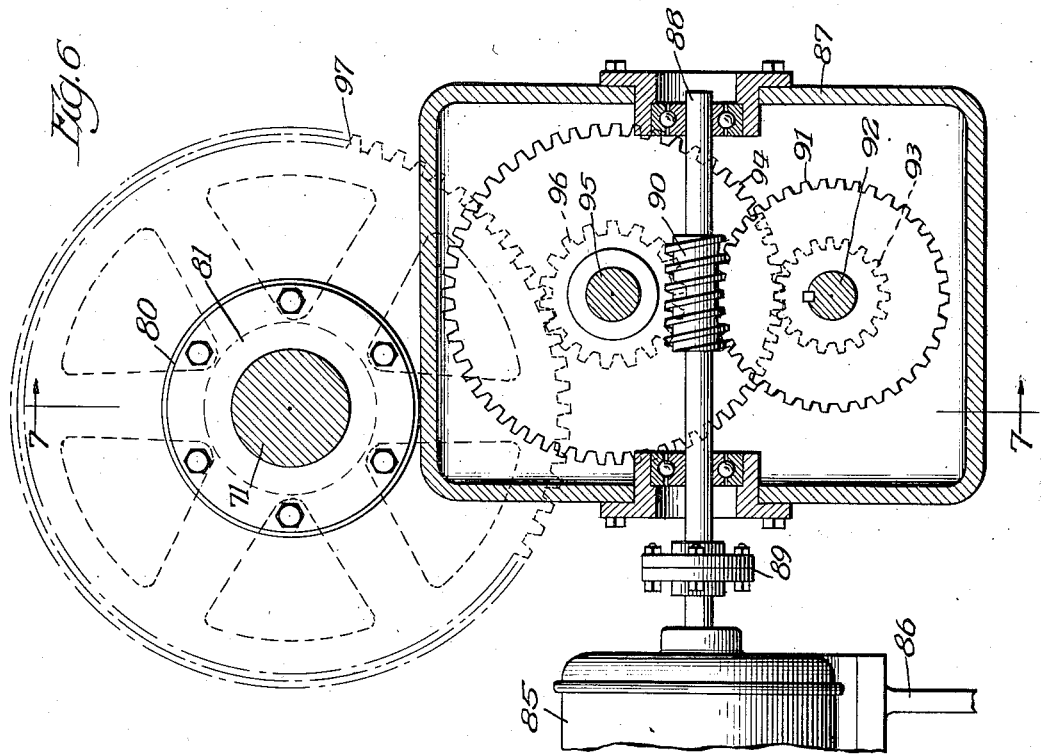
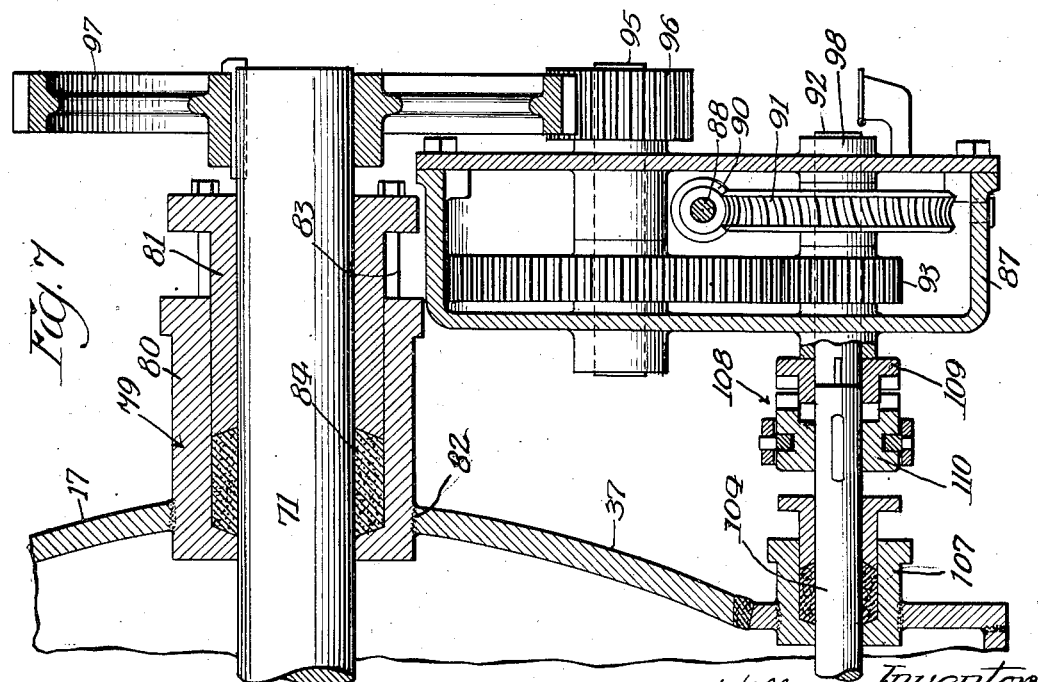

Patented Nov. 26, 1935

2,022,403

UNITED STATES PATENT OFFICE 2,022,403

FILTER

William L. Chapman, Harvey, Ill., assignor to Vallez Rotary Filters Company, Bay City, Mich., a corporation of Michigan Application September 30, 1931, Serial No. 565,962
Renewed October 11, 1935

5 Claims. (Cl. 210—200)

The present invention relates generally to filters. More particularly the invention relates to that type of filter which is known as a rotary leaf pressure filter and comprises (1) a horizontally extending, substantially cylindrical casing which consists of an upper semi-cylindrical section and a complemental lower, semi-cylindrical section and has a longitudinal series of inspection doors in the upper section thereof and an inlet for the material to be filtered and a longitudinal trough in its lower section; (2) a hollow shaft which extends through and is journalled in bearings at the ends of the casing and is driven at a comparatively low speed during the filtering operation; (3) a series of filter leaves which are mounted fixedly on the hollow shaft and are constructed to supply the filtrate to the interior of the shaft for discharge from the casing; (4) a spray pipe which is disposed in the top part of the upper section of the casing and embodies jet openings in the lower portion thereof whereby steam or compressed air may be jetted against the sides of the filter leaves to break up and remove the cakes which form and accumulate on the leaves durng operation of the filter; and (5) a spiral conveyor which is mounted in the trough in the lower section of the casing and serves, during cleaning of the filter, to discharge through an opening in the lower casing-section the cake pieces which are removed from the filter leaves by the spray pipe.

One object of the invention is to provide a filter of the aforementioned type in which discharge of the cake from the casing is expedited by virtue of the fact that the trough for the spiral conveyor is located at one side of the extreme bottom portion of the lower casing-section and is so positioned that during removal of the cakes from the leaves by the jets of steam or compressed air from the spray pipes, the cake pieces are forced therein by the leaves in response to drive of the hollow shaft.

Another object of the invention is to provide a filter of the rotary leaf pressure type in which the spray pipe for use in effecting removal of the cakes from the side faces of the leaf filters is located at one side of the extreme top part of the upper casing-section and is positioned directly adjacent to the inspection doors so that the jet openings therein may be readily cleaned without the necessity of removing the pipe from the casing.

A further object of the invention is to provide a filter of the rotary leaf type which is generally of new and improved construction, may be manufactured at a reasonable cost and is capable of withstanding greater internal pressure than previously designed filters of the same general character.

Other objects of the invention and the various advantages and characteristics of the present filter construction will be apparent from a consideration of the following detailed description.

The invention consists in the several novel features which are hereinafter set forth and are more particularly defined by claims at the conclusion hereof.

In the drawings which accompany and form a part of this specification or disclosure and in which like numerals of reference denote corresponding parts throughout the several views:

Fig. 1 is a view, partly in side elevation and partly in vertical longitudinal section, of a filter embodying the invention;

Fig. 2 is a view of one end of the filter;

Fig. 3 is a view of the other end of the filter, exhibiting in detail the construction and arrangement of the gearing for driving the hollow shaft for the filter leaves and the spiral conveyor for discharging the cake pieces from the casing;

Fig. 4 is a vertical transverse section on the line 4—4 of Fig. 1;

Fig. 5 is a vertical longitudinal section showing the construction of the casing of the filter;

Fig. 6 is a detail of the gearing for driving the hollow shaft and the spiral conveyor; and Fig. 7 is a section on the line 7—7 of Fig. 6.

The filter which forms the subject matter of the invention is designed to filter any kind of material in liquid or semi-liquid form and comprises a horizontally extending, substantially cylindrical casing 10, a hollow shaft 11 and a set of leaf filters 12 on the shaft. The hollow shaft 11 extends through and lengthwise of the casing and is driven as hereinafter described so as to rotate the filter leaves during operation of the filter. The filter leaves 12 are mounted in spaced relation on the shaft and are arranged so that the material to be filtered passes therethrough for filtering purposes and the filtrate is supplied to the interior of the shaft for discharge from the casing.

The casing 10 is designed to withstand a comparatively high pressure and consists of a semi-cylindrical upper section 13 and a complemental lower, semi-cylindrical section 14. The upper section 13 is fabricated from steel plate and consists of a curved or half round side wall 15 and a pair of semi-circular end walls 16 and 17. The end walls are welded to the end margins of the side wall 15 and are dished or bowed outwardly so that the upper casing-section as a whole, is extremely rigid and is well adapted to withstand comparatively great internal pressure. A pair of longitudinally extending slots 18 and 19 are formed in the side wall 15. The slot 18 is located at one side of the extreme top part of the side wall 15 and extends from the end wall 16 to the end wall 17. The slot 19 is slightly wider than the slot 18 and also extends from the end wall 16 to the end wall 17. It is disposed directly beneath and is parallel to the opening 18 and forms an opening whereby access may be had to the interior of the casing. A fabricated frame 20 is associated with the slot 19. This frame supports a plurality of inspection doors 21 and consists of a pair of steel side bars 22 and 23 and a pair of steel end bars 24. The side bars are welded or otherwise secured to the portions of the side wall of the upper casing-section which define the side edges of the opening 19. The end bars are welded or otherwise secured to the end walls of the upper casing-section and operate, together with cross pieces 25 to hold the side bars in laterally spaced relation. The cross pieces 25 extend between the side bars and tend to strengthen or reinforce the frame 20. The inspection doors 21 are disposed end to end and operate when in their closed position, to cover the frame 20 and thus to close the slot 19. They are connected pivotally to links 26. The latter extend circumferentially with respect to the casing and are connected pivotally by pins 27 to pairs of ears 28 which are formed integrally with and project outwardly from the side bar 23 of the frame 20. The distal ends of the links 26 are slotted so as to receive bolts 30 which are connected pivotally by pins 31 to pairs of ears 32. Nuts 33 are mounted on the distal ends of the bolts 30 and operate, when tightened, to swing the links 26 inwardly so as to clamp the inspection doors 21 in their closed position. The pairs of ears 32 are formed integrally with the side bar 22 of the cast steel frame 20 and are extended so as to form portions 32ª which overhang the slot 18 and are welded to the portion of the side wall 15 of the upper casing-section which defines the upper side margin of the slot 18. A strip 34 serves to close the slot 18. This strip is semi-cylindrical in conformation and forms a spray pipe compartment 34ª. Said strip 34 fits and is secured in semi-cylindrical recesses 32ᵇ in the extended portions 32ª of the ears 32, and is arranged so that one of the side edges thereof abuts against the side bar 22 of the frame 20 and its other side edge abuts against the portion of the side wall 15 which defines the upper side edge of the slot 18. By forming the ears 32 so that they overhang the slot 18, the strip 34 is securely held against displacement.

The lower section 14 of the casing 10 is fabricated from steel plate and comprises a curved or half round side wall 35 and a pair of semicircular end walls 36 and 37. The side wall 35 is arranged so that the side margins thereof abut against the side margins of the side wall 15 of the upper casing-section 13. The end walls 36 and 37 are joined in any suitable manner to the end margins of the side wall 35. The end wall 36 is associated with the end wall 16 of the upper casing-section 13 and has the upper edge thereof arranged so that it abuts against the lower edge of said end wall 16. The end wall 37 is associated with the end wall 17 of the upper section of the casing and has the upper edge thereof arranged in abutting relation with respect to the lower edge of the end wall 17. The side wall 35 has formed in the lower portion thereof a longitudinally extending opening 38. The latter is arranged so that the major portion thereof is located at one side of the extreme bottom portion of the lower casing-section 14, and is positioned substantially diametrically opposite the slots 18 and 19. It extends from the end wall 36 to the end wall 37 and forms the entrance to a longitudinally extending trough 39. The latter is defined by a pair of steel side plates 40 and 41 and a bottom plate 42. The bottom plate 42, like the side plates 40 and 41, is formed of steel. It is curved so that it is substantially semi-cylindrical in conformation and forms the bottom of the trough 39. The side plate 40 extends substantially vertically and is welded at the bottom margin thereof to one of the side margins of the bottom plate 42. It forms one side of the trough 39 and is welded at its upper margin to the side wall 35 of the lower casing-section. The side plate 41 forms the other side of the trough 39 and extends between and is welded to the other side margin of the bottom plate 42 and the side wall 35. The side plates 40 and 41 are preferably arranged so that they are upwardly divergent and form a flared mouth or entrance way for the trough. The ends of the trough are closed by means of a pair of end pieces 43. The latter are in the nature of extensions of the side walls of the lower casing-section and are welded to the end edges of the side plates 40 and 41 and the bottom plates 42. To strengthen the plates 40, 41 and 42, a unitary structure 44 is provided. This structure is formed of steel and comprises a series of U-shaped ribs 45 and cross ribs 46. The U-shaped ribs 45 extend around and are welded or otherwise secured to the plates 40, 41 and 42 and have the upper ends thereof connected to the side wall 35 of the lower casing-section. The cross ribs 46 extend between and space apart the ribs 45. They are formed integrally with the ribs 45 and underlie the extreme lower portion of the bottom plate 42, as clearly indicated in Fig. 4 of the drawings.

The upper and lower sections of the casing are held in clamped relation by a set of swing bolts 47 at one side of the casing and a set of swing bolts 48 at the other side of the casing. The bolts 47 are formed of forged steel and are connected pivotally to a rod 49 which is carried in aligned openings 50 in a set of lugs 51. The lugs 51 are welded to the side wall 35 of the lower casing-section 14 and are arranged so that they alternate with the swing bolts 47, and the openings 50 are disposed directly beneath and in vertical alignment with the adjoining side margin of the side wall 35 of the casing-section 14. The distal ends of the swing bolts 47 are shaped to form externally threaded stems 47ª. These stems carry clamp nuts 47ᵇ and fit between lugs 52 on plates 53. The plates 53 are preferably formed of steel castings and are secured in any suitable manner to the portion of the side wall 15 of the upper casing-section that is directly above the lugs 51. The lugs 52 project outwardly from and are formed integrally with the plates and have flattened upper portions against which abut the nuts 47ᵇ. When the nuts 47ᵇ are tightened, the bolts 47 operate to hold the casing sections in clamped relation. The central or intermediate portions of the swing bolts 47 are curved conformably to the casing and are constructed so that when they are in their operative position, the externally threaded stems 47ª are positioned in vertical alignment with the rod 49 and the contiguous abutting edges of the casing-sections 13 and 14. As a result of this arrangement, the casing is adapted to withstand exceedingly great internal pressure inasmuch as the clamping pressure of the swing bolts 47 is applied through the contiguous meeting side margins of the casing-sections and the lines of force of the bolts coincide with the lines of force tending to spread the sections apart. The lugs 52 are arranged so that the flattened upper portions thereof are disposed directly above and in vertical alignment with the pivot rod 49. The swing bolts 48 are located diametrically opposite the swing bolts 47 and are pivotally mounted on a rod 54. This rod is carried by a set of lugs 55 which are welded to the side wall 35 of the lower casing-section 14. The central portions of the swing bolts 48 are curved conformably to the periphery of the casing similarly to the central portions of the swing bolts 47. The upper ends of the swing bolts 48 embody externally threaded stems which carry clamp nuts 56. The latter cooperate with a plurality of lugs 57 on plates 58 to effect a clamping connection between the two casing-sections. The plates 58 and the lugs 57 correspond respectively with the plates 53 and the lugs 52. The abutting edges of the walls 16 and 36 of the casing-sections are clamped together by bolts 59. The latter extend through bars 60 which are welded to and project outwardly from the aforesaid abutting margins of the end walls 16 and 36. The abutting edges of the end walls 17 and 37 of the casing-sections are clamped together by bolts 61 which extend through bars on said end walls 17 and 37.

The casing 10 is supported by means of a pair of legs 62 and a pair of legs 63. The legs 62 support one end of the casing and are bolted or otherwise secured to a bracket structure 64 which is attached to the end wall 36 of the lower casing-section 14. The legs 63 support the other end of the casing and are secured to a bracket structure 65 which is attached to the end wall 37 of the casing-section 14.

The material to be filtered is introduced into the casing by way of a plurality of flanged pipe connections 66. These connections are located between the ribs 45 of the unitary reinforcing structure 44, are welded to the side plate 41 and communicate with the trough in the lower casing-section 14 by way of openings 67 in the aforesaid side plate 41. An outlet connection 69 for use during cleaning of the filter is connected to the bottom plate 42. This connection is located at the central part of the casing, is closed by a plate or valve during normal operation of the filter and communicates with the trough via an opening in the central portion of the bottom plate 42.

The hollow shaft 11 which supports the filter leaves 12 has one end thereof connected to a pipe element 70 and is provided at its other end with a spindle 71. The pipe element 70 forms an outlet for the filtrate, extends through a packing box 72 and is journalled in a bearing 73. The packing box 72 comprises a cylindrically shaped split casting 74 of steel and a follower 75. The split casting is secured in a circular opening 76 in the meeting or abutting margins of the end walls 16 and 36 of the casing sections 13 and 14 and forms a bearing for the inner end of the pipe element. The follower 75 is slidably mounted on the pipe element and serves to clamp an annular band 77 of packing material around the pipe element so as to prevent leakage of the material to be filtered through the end of the casing embodying the end walls 16 and 36. The bearing 73 surrounds the outer end of the pipe element and embodies a supporting arm 78 which is fixedly secured to and projects outwardly from the bracket structure 64. The spindle 71 is solid so as to close the contiguous end of the hollow shaft. It is journalled in a bearing 79. The latter is in the nature of a packing box and comprises a cylindrically shaped split casting 80 of steel and a follower 81. The split casting is secured in a circular opening 82 in the meeting or abutting margins of the end walls 17 and 37. The follower 81 is mounted around the central portion of the spindle and fits slidably in the casting 80. It is held in place by bolts 83 and operates to clamp an annular strip 84 of clamping material around the spindle so as to prevent leakage of the material to be filtered through the end of the casing embodying the end walls 17 and 37.

The hollow shaft 11 is driven by an electric motor 85 so as to rotate the filter leaves 12. The motor 85 is mounted on a bracket 86 on one of the legs 62 and drives the shaft through the medium of speed reducing gearing. The latter is mounted in a cast metal housing 87 on the bracket structure 65 and comprises a horizontally extending shaft 88 which extends through and is journalled in the central portion of the housing and is connected to the armature shaft of the motor by a coupling 89; a worm 90 which is formed integrally with the portion of the shaft 88 that is disposed within the housing; a worm wheel 91 which is fixed to a horizontally extending shaft 92 and meshes with and is driven by the worm 90; a pinion 93 which is fixed to the shaft 92 and meshes with and drives a gear wheel 94; a shaft 95 which is located above the shaft 88 and has keyed thereto the gear wheel 94; a pinion 96 which is disposed outside of the casing and is fixedly secured to one end of the shaft 95; and a gear wheel 97 which meshes with and is driven by the pinion 96 and is keyed or otherwise secured to the outer end of the spindle 71. The housing 87 is designed to contain oil so that the various parts of the gearing disposed therein are at all times properly lubricated. The shaft 92 is located beneath the worm shaft 88 and is journalled in bearings 98 in the walls of the housing.

The filter leaves 12 are circular and embody laterally spaced, screen covered, foraminous side walls 12ª. In addition to the side walls, the filter leaves embody enlarged hubs 12ᵇ which are fixedly secured to the hollow shaft 11 and embody ducts which register with apertures (not shown) in the shaft and serve to convey the filtrate into the interior of the shaft for discharge through the pipe element 70. Angle iron bars 99 are secured to the outer portions of the filter leaves and serve in conjunction with the hubs 12ᵇ, to hold the leaves in spaced relation. They also serve to scrape the inner periphery of the casing 10 so as to keep the latter clean and prevent the accumulation of sediment.

In order to free the filter leaves from the cakes which accumulate on the side walls thereof, a spray pipe 100 is provided. This spray pipe extends longitudinally of the casing and is disposed in the compartment 34ª. One end of the pipe extends through a packing or stuffing box 101 in the end wall 16 of the upper casing-section 13 and is connected to receive steam or compressed air. The other end of the pipe is closed by a cap 100ª and has a plate 100ᵇ welded thereto. Bolts 100ᶜ extend through the plate 100ᵇ and into a plate 100ᵈ which is in the nature of a stuffing box and is secured on the end wall 17 of the upper casing section. By manipulating the bolts 100ᶜ, the pipe may be adjusted longitudinally. The portion of the spray pipe within the casing embodies downwardly extending jet openings 102. These openings are arranged so as to cause jets of steam or air under pressure to impinge directly against the cakes on the filter leaves in order to cause them to dry and fall in pieces to the bottom of the casing. By arranging the spray pipe within the compartment 34ᵃ which is next to the inspection doors 21, cleaning of the jets may be readily effected through the slot 19 without removing the pipe from its operative position. During normal operation of the filter, the supply of steam or compressed air to the pipe is cut off. When the cake formation on the filter leaves becomes too thick and it is desired to clean the casing, the supply of material to be filtered to the casing is cut off and the material within the casing is drained by way of the outlet connection 69. After drainage of the material from the casing, steam or compressed air is supplied to the pipe 100 and is jetted downwardly by the jet openings 102 against the sides of the filter plates with the result that the cakes on the filter plates are dried and fall to the bottom of the casing.

The cake pieces which accumulate on the bottom of the casing during cleaning of the filter fall into the trough 39 and are conveyed to the outlet connection 69 for discharge purposes by means of a spiral conveyor 103. This conveyor comprises a shaft 104, a right hand spiral plate 105 and a left hand spiral plate 106. The shaft 104 extends longitudinally of the trough and has the ends thereof mounted in packing boxes 107 in the end pieces 43. The right hand spiral plate 105 and the left hand spiral plate 106 are secured to opposite ends of the shaft 104 and operate, during drive of the shaft to feed the cake pieces into the outlet connection 69. Drive of the conveyor is effected through the medium of a clutch 108 which consists of a pair of clutch members 109 and 110. The clutch member 109 is mounted on one end of, and is driven by the shaft 92 of the gearing for driving the hollow shaft 11 from the electric motor 85. The clutch member 110 is slidably mounted on one end of the conveyor shaft 104 and operates, when shifted into mesh with the member 109, to effect a driving connection between the conveyor and the electric motor. By connecting the spiral conveyor so that it is driven by the gearing for the hollow shaft 11, the motor 85 serves to drive both the hollow shaft and the spiral conveyor. When the clutch for the spiral conveyor is shifted into its operative position, the motor drives conjointly the hollow shaft and the spiral conveyor and the filter leaves are rotated so that the cake formation on the side walls thereof are rotated into contact with the jets of steam or compressed air emanating from the spray pipe 100. During cleaning of the filter, the cake pieces after being loosened from the sides of the filter leaves, fall to the bottom of the casing, as previously pointed out. By virtue of the fact that the leaves are rotated during the cleaning operation, the pieces, instead of accumulating directly on the bottom, accumulate at one side. The trough 39 for the spiral conveyor is located at one side of the extreme bottom of the lower casing-section 14 so that it is directly beneath the place at which the cake pieces are rotated by the filter leaves. As a result of this arrangement, the cake pieces drop directly into the trough and are quickly removed from the casing by the spiral conveyor.

The herein disclosed filter may be manufactured at a comparatively low cost and is capable of being used in connection with material under comparatively high pressure by reason of the fact that the casing thereof is fabricated from pieces or parts of steel and the bolts which are used to hold the sections of the casing in clamped relation are constructed and formed so as to apply the clamping pressure directly through the abutting margins or edges of the sections. By reason of the fact that the trough for the spiral conveyor is located at one side of the extreme bottom part of the lower casing-section, removal of the cake pieces from the casing is greatly facilitated and expedited during cleaning of the filter.

The invention is not to be understood as restricted to the details set forth, since these may be modified within the scope of the appended claims, without departing from the spirit and scope of the invention.

Having thus described the invention, what I claim as new and desire to secure by Letters Patent, is:

1. In a batch type filter of the character described, the combination of a substantially cylindrical, horizontally extending casing provided with an inlet for receiving under pressure the material to be filtered, means at the bottom of the casing forming a depending trough extending from one end of the casing to the other and arranged so that the major portion thereof is located at one side of the extreme bottom point of the casing, a normally closed outlet for the trough, a hollow element extending longitudinally of the casing and supported for rotation at the ends of the casing, a plurality of laterally spaced filter leaves secured fixedly to the element and connected to supply the filtrate to the interior of said element for discharge from the casing, means adapted to be operated during cleaning of the filter for removing and loosening the cake formation from the sides of the filter leaves, means for driving the element in such direction as to cause the filter leaves to revolve through the material during normal use of the filter and to force the loosened cake pieces downwardly and then substantially horizontally across the extreme bottom of the casing in the direction of the trough, and then into said trough during cleaning of the filter, and a spiral conveyor disposed in the trough and operative during drive thereof and after opening of the outlet to discharge the cake pieces from the trough through said outlet.

2. In a filter of the character described, the combination of a substantially cylindrical horizontally extending casing provided with an inlet for receiving under pressure the material to be filtered and embodying in the top portion thereof and at one side of its extreme top point a longitudinal series of inspection openings, a plurality of doors for closing the inspection openings, a hollow element extending longitudinally of the casing and supported for rotation at the ends of the casing, a plurality of laterally spaced filter leaves secured fixedly to the element and connected to supply the filtrate to the interior of said element for discharge from the casing, a longitudinally extending spray pipe connected to receive fluid under pressure and disposed in the top portion of the casing at said one side of the top point and positioned immediately above and in substantially contacting relation with the inspection openings so that it is accessible from the outside of the casing by way of said openings, said pipe having jet openings for spraying the fluid against the sides of the filter leaves and being adapted to be used in cleaning the filter to remove and loosen the cake formation from the sides of the filter leaves, means for driving the element so as to cause the filter leaves to revolve through the material during normal use of the filter and to bring successive portions of the cake formation into range of the jets of fluid under pressure from the spray pipe during cleaning of the filter, and means associated with the bottom of the casing for discharging the cake pieces from the casing.

3. In a filter of the character described, the combination of a substantially cylindrical horizontally extending casing provided with an inlet for receiving under pressure the material to be filtered and embodying in the top portion thereof a pair of substantially parallel slots, a frame secured to the casing over one of the slots and forming with said one slot a series of inspection openings, doors for closing the inspection openings, a member associated with and attached to the frame and shaped to close and form a longitudinal compartment over the other slot, a hollow element extending longitudinally of the casing and supported for rotation at the ends of the casing, a plurality of laterally spaced filter leaves secured fixedly to the element and connected to supply the filtrate to the interior of the element for discharge from the casing, a longitudinally extending spray pipe connected to receive fluid under pressure and disposed in the aforesaid compartment in such a manner that it is accessible from the outside of the casing by way of the inspection openings, said pipe having jet openings for spraying the fluid against the sides of the filter leaves and being adapted to be used in cleaning the filter to remove and loosen the cake formation from the sides of the filter leaves, means for driving the element so as to cause the filter leaves to revolve through the material during normal use of the filter and to bring successive portions of the cake formation into range of the jets of fluid under pressure from the spray pipe during cleaning of the filter, and means associated with the bottom of the casing for discharging the cake pieces from the casing.

4. In a filter of the character described, the combination of a substantially cylindrical horizontally extending casing provided with an inlet for receiving under pressure the material to be filtered and embodying in the top portion thereof a pair of substantially parallel slots, a frame secured to the casing over one of the slots and forming with said one slot a series of inspection openings, ears attached to the frame and extending over the other slot, doors connected to the ears and arranged to close the inspection openings, a member secured to said ears and shaped to close and form a longitudinal compartment over said other slot, a hollow element extending longitudinally of the casing and supported for rotation at the ends of the casing, a plurality of laterally spaced filter leaves secured fixedly to the element and connected to supply the filtrate to the interior of said element for discharge from the casing, a longitudinally extending spray pipe connected to receive fluid under pressure and disposed in the aforesaid compartment in such a manner that it is accessible from the outside of the casing by way of the inspection openings, said pipe having jet openings for spraying the fluid against the sides of the filter leaves and being adapted to be used in cleaning the filter to remove and loosen the cake formation from the sides of the filter leaves, means for driving the element so as to cause the filter leaves to revolve through the material during normal use of the filter and to bring successive portions of the cake formation into range of the jets of fluid under pressure from the spray pipe during cleaning of the filter, and means associated with the bottom of the casing for discharging the cake pieces from the casing.

5. In a filter of the character described, the combination of a substantially cylindrical horizontally extending casing provided with an inlet for receiving under pressure the material to be filtered and embodying in the upper portion thereof a longitudinal series of inspection openings, a plurality of doors for closing the inspection openings, a hollow element extending longitudinally of the casing and supported for rotation at the ends of the casing, a plurality of laterally spaced filter leaves secured fixedly to the element and connected to supply the filtrate to the interior of the element for discharge from the casing, a longitudinally extending spray pipe extending through and slidable longitudinally in the ends of the casing and disposed in the top portion of the casing directly adjacent to the inspection openings so that it is accessible from the outside of the casing by way of said openings, said pipe having one end thereof connected to receive fluid under pressure and being provided with jet openings for spraying the fluid against the sides of the filter leaves and adapted to be used in cleaning the filter to remove and loosen the cake formation from the sides of the filter leaves, screw means associated with one of the casing ends whereby the pipe may be slid longitudinally so as to bring the jet openings into proper position with respect to the leaves, means for driving the element so as to cause the filter leaves to revolve through the material during normal use of the filter and to bring successive portions of the cake formation into range of the jets of fluid under pressure from the spray pipe during cleaning of the filter, and means associated with the bottom of the casing for discharging the cake pieces from the casing.

WILLIAM L. CHAPMAN.